(12) United States Patent
Chiu et al.

(10) Patent No.: US 11,751,642 B2
(45) Date of Patent: Sep. 12, 2023

(54) BUCKLE DEVICE CAPABLE OF DISPLAYING LOCKED STATE

(71) Applicant: BROGENT TECHNOLOGIES INC., Kaohsiung (TW)

(72) Inventors: Shih-Kuang Chiu, Kaohsiung (TW); Chia-Wei Yeh, Kaohsiung (TW); Juei-Tsung Chen, Kaohsiung (TW)

(73) Assignee: BROGENT TECHNOLOGIES INC., Kaohsiung (TW)

( * ) Notice: Subject to any disclaimer, the term of this patent is extended or adjusted under 35 U.S.C. 154(b) by 0 days.

(21) Appl. No.: 17/889,904

(22) Filed: Aug. 17, 2022

(65) Prior Publication Data

US 2023/0072193 A1    Mar. 9, 2023

(30) Foreign Application Priority Data

Aug. 19, 2021   (TW) ................................ 110130748

(51) Int. Cl.
*A44B 11/25*   (2006.01)
*B60R 22/18*   (2006.01)
*B60R 22/48*   (2006.01)

(52) U.S. Cl.
CPC .......... *A44B 11/2503* (2013.01); *B60R 22/18* (2013.01); *B60R 22/48* (2013.01); *A44D 2203/00* (2013.01); *B60R 2022/1806* (2013.01)

(58) Field of Classification Search
CPC ............ A44B 11/2503; A44B 11/2523; A44B 11/2573; A44B 11/2549; A44B 11/2569; B60R 22/48; B60R 2022/4816; B60R 22/18; B60R 2022/1806; A44D 2203/00
See application file for complete search history.

(56) References Cited

U.S. PATENT DOCUMENTS

| 5,781,971 | A * | 7/1998 | Petersen, III | ...... A44B 11/2523 |
| | | | | 24/642 |
| 6,205,629 | B1 * | 3/2001 | Becker | ............... A44B 11/2569 |
| | | | | 24/303 |
| 6,357,091 | B1 * | 3/2002 | Devereaux | ........ B60R 21/01546 |
| | | | | 24/303 |
| 6,389,661 | B1 * | 5/2002 | Brown | ............. B60R 21/01546 |
| | | | | 24/642 |
| 6,474,435 | B1 * | 11/2002 | Devereaux | ........ B60R 21/01546 |
| | | | | 280/801.1 |

(Continued)

*Primary Examiner* — Robert Sandy
*Assistant Examiner* — Louis A Mercado
(74) *Attorney, Agent, or Firm* — Muncy, Geissler, Olds & Lowe, P.C.

(57) ABSTRACT

A buckle device capable of displaying a locked state includes a main body unit, a latch unit, a fastening unit, an electromagnetic unit, and a control unit. The main body unit includes a main body and the latch unit includes a detachable tongue element. The fastening unit includes a bolt body interfering with the tongue element. The electromagnetic unit includes an electromagnetic module and an electromagnetic rod. The electromagnetic module controls the electromagnetic rod to interfere with the bolt body. The control unit includes a control module, a display module and a magnetic rod detection module for detecting the position of the electromagnetic rod. The control unit receives detection information of the magnetic bolt detection module and controls the display module to display a current state according to the position of the at least one electromagnetic rod.

15 Claims, 17 Drawing Sheets

(56) References Cited

U.S. PATENT DOCUMENTS

| | | | | |
|---|---|---|---|---|
| 7,296,825 | B1* | 11/2007 | Zia | B60R 22/48 |
| | | | | 280/801.1 |
| 7,523,802 | B2* | 4/2009 | Kamiki | B60R 22/48 |
| | | | | 340/576 |
| 7,657,979 | B2* | 2/2010 | Midorikawa | H01H 13/186 |
| | | | | 24/633 |
| 8,173,919 | B2* | 5/2012 | Midorikawa | B60R 22/48 |
| | | | | 200/61.58 B |
| 8,650,726 | B2* | 2/2014 | Nimura | A44B 11/2523 |
| | | | | 24/642 |
| 10,470,528 | B2* | 11/2019 | Jimenez Hernandez | A44B 11/2573 |
| 10,772,390 | B2* | 9/2020 | Chiu | A44B 11/2523 |
| 11,213,102 | B1* | 1/2022 | Chiu | A44B 11/2573 |

* cited by examiner

BUCKLE DEVICE CAPABLE OF DISPLAYING LOCKED STATE

FIELD OF THE INVENTION

The present invention relates to a buckle device for a safety belt, and more particularly, to a buckle device capable of displaying locked state.

BACKGROUND OF THE INVENTION

The current amusement facilities (e.g., motion simulator) provide the haptic feedback through a series actions like moving or rotating the seats. Seat belts will be installed on the seats to keep the occupants safe. Furthermore, the seats will be provided with a fastening structure using plates and latches to fix the occupants on the seats, and prevent accidents during operation, so that the occupants can safely sit on the seat to feel the haptic feedback produced by motions of the seat.

Referring to FIG. 1, Taiwanese Patent No. 1684541, which relates to a buckle device 10 that can provide a latch plate device 11 for insertion. The buckle device 10 includes two vertical disks 101, a pressing body 102, and two electromagnetic rods 103, two first springs 104 arranged between the two vertical disks 101 and the pressing body 102, two second springs 105 respectively arranged on the two electromagnetic rods 103, and two detectors 106 for detecting the two electromagnetic rods 103.

The vertical disks 101 can interfere with the latch plate device 11 to fasten the latch plate device 11 in the buckle device 10. After the pressing body 102 is pressed, the vertical disks 101 can be released from the locked state, such that the vertical disks 101 are pushed by the first springs 104 and meanwhile, the latch plate device 11 is pushed outward.

The second springs 105 are designed to push the electromagnetic rods 103 into the vertical disks 101, such that the vertical disks 101 can be fastened. Even if the pressing body 102 is pressed, the vertical disks 101 cannot be moved. Therefore, the pressing body 102 can release the locked state occurred between the vertical disks 101 and the latch plate device 11 only when the electromagnetic rods 103 are separated from the vertical disks 101.

Although the prior art discloses a buckle device, it still has the following shortcomings in use:

1. Not easy to use in dark place: Many devices (e.g., a motion simulator) that provide motion functions will provide matching movies, and the indoor environment is usually dark, such that the movie can be clearly presented, but the dark environment may cause the occupants on the seat to be difficult to perceive a position of a buckle device. As a result, it is hard to smoothly lock or release the buckle device.

2. Unable to tell locked states from appearance: When the occupant sits on the seat of the motion simulator and the control device activates an electromagnetic lock, a staff will go to the seat to confirm the locked state of the buckle device one by one. The staff must press the button to confirm that a tongue element of the buckle device is not released, indicating that the locked state of the buckle device is well locked. However, the staff cannot directly determine the locked state from the appearance of the buckle device.

3. Difficult to keep a social distance: According to above description, the staff must be very close to the occupants before they can touch and press the pressing body of the buckle device to confirm whether the buckle device has been locked well. It is not only difficult for the staff to keep a social distance, but it is also easy to spread viruses or bacteria.

4. Complex structure: The conventional vertical disk has a complex structure provided with multiple grooves and protrusions for accommodating springs or fastening structures, and cannot be assembled step by step. The operators need to depend on actual situation to install the relevant components in the buckle device, and overcomes the elastic force generated by the spring structure, or the undefined fastening position condition caused by the rotation, so the structure is complex and difficult to assemble.

5. Unable to prevent the pressing body from being pressed: After the conventional electromagnetic rods interfere with the vertical disks, the pressing body can still be pressed. Although the vertical disks are unable to be moved due to the electromagnetic rods, the pressing body can be pressed which will cause the occupant uneasiness.

Therefore, how to quickly confirm the position of the buckle device in a dark environment, and provide the staff to confirm the locked state of the buckle device from the appearance, in order to prevent contacts between staffs and occupants to further prevent the spread of germs is an urgent objective for the relevant technical personnel.

SUMMARY OF THE INVENTION

It is an objective of the present invention to provide a buckle device capable of displaying a locked state, in order to solve the above-mentioned problems.

As will be seen more clearly from the detailed description following below, the claimed buckle device capable of displaying a locked state comprises a main body, a latch unit, a fastening unit, an electromagnetic unit and a control unit. The main body unit comprises a main body defining and surrounding an accommodating space. The latch unit comprises a tongue element detachably arranged in the accommodating space. The fastening unit comprises at least one bolt body arranged on the main body. The at least one bolt body detachably interferes with the tongue element arranged in the accommodating space. When the at least one bolt body interferes with the tongue element, the tongue element is securely fastened to prevent the tongue element from leaving the accommodating space. The electromagnetic unit comprises at least one electromagnetic module and at least one electromagnetic rod. The at least one electromagnetic unit is arranged in the main body. The at least one electromagnetic rod is arranged through the at least one electromagnetic module. The control unit comprises a control module electrically connected to the at least one electromagnetic module, a magnetic bolt detection module arranged on the main body and electrically connected to the control module, and a display module electrically connected to the control module. The control module controls whether the electromagnetic module is excited or not, the magnetic bolt detection module is configured to detect the position of the at least one electromagnetic rod. When the electromagnetic module is excited and generates a magnetic force for the at least one electromagnetic rod, the at least one electromagnetic rod is moved to a release position, such that the at least one electromagnetic rod and the at least one bolt body are separated from each other. When the electromagnetic module is not excited and the at least one bolt body locks the tongue element, the at least one electromagnetic rod is moved to a lock position and interferes with the at least one bolt body, in order to lock the at least one bolt body to prevent the at least one bolt body from releasing the tongue element. The control module is configured to receive detection information of the magnetic bolt detection module and controls the display module to display a current state according to the position of the at least one electromagnetic rod.

The advantage of the embodiments of this invention is that when the electromagnetic rod is moved to the lock position, it can be confirmed that the tongue element cannot be detached from the accommodating space. With the detection information of the magnetic bolt detection module, the control module can control the display module to display a current state according to the position of the at least one electromagnetic rod, such that the staff can confirm the locked state of the buckle device without touching the buckle device.

DETAILED DESCRIPTION

Figure 1:
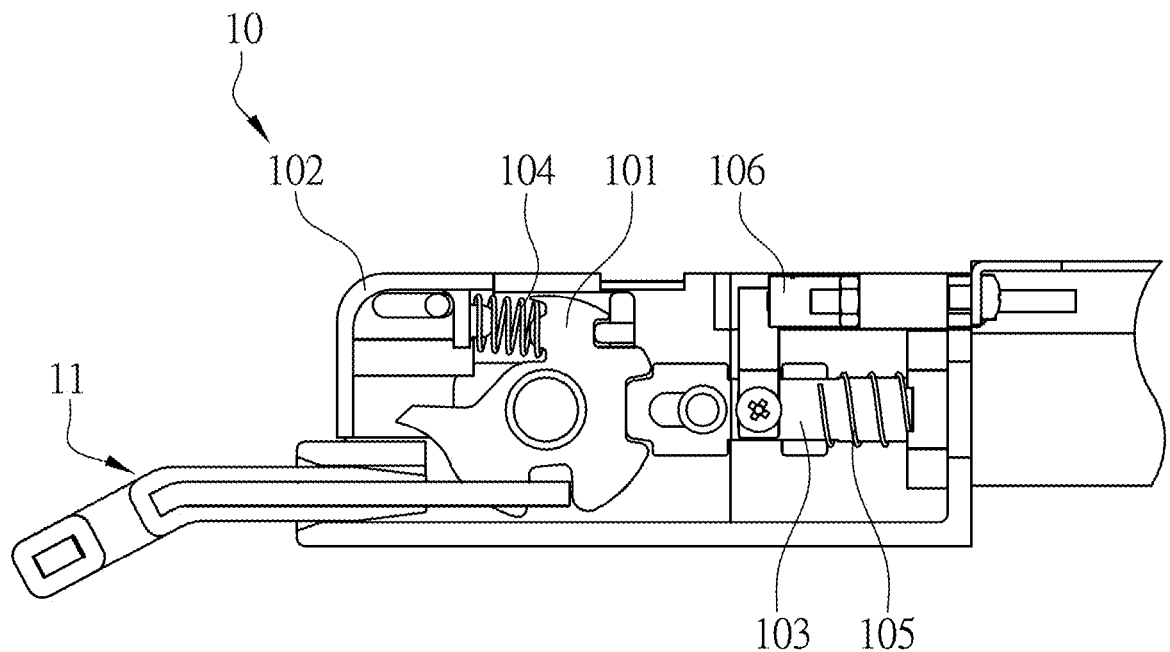
FIG. 1 is a schematic side view illustrating a buckle device using the vertical disks of Taiwanese Patent No. 1684541.
Figure 2:
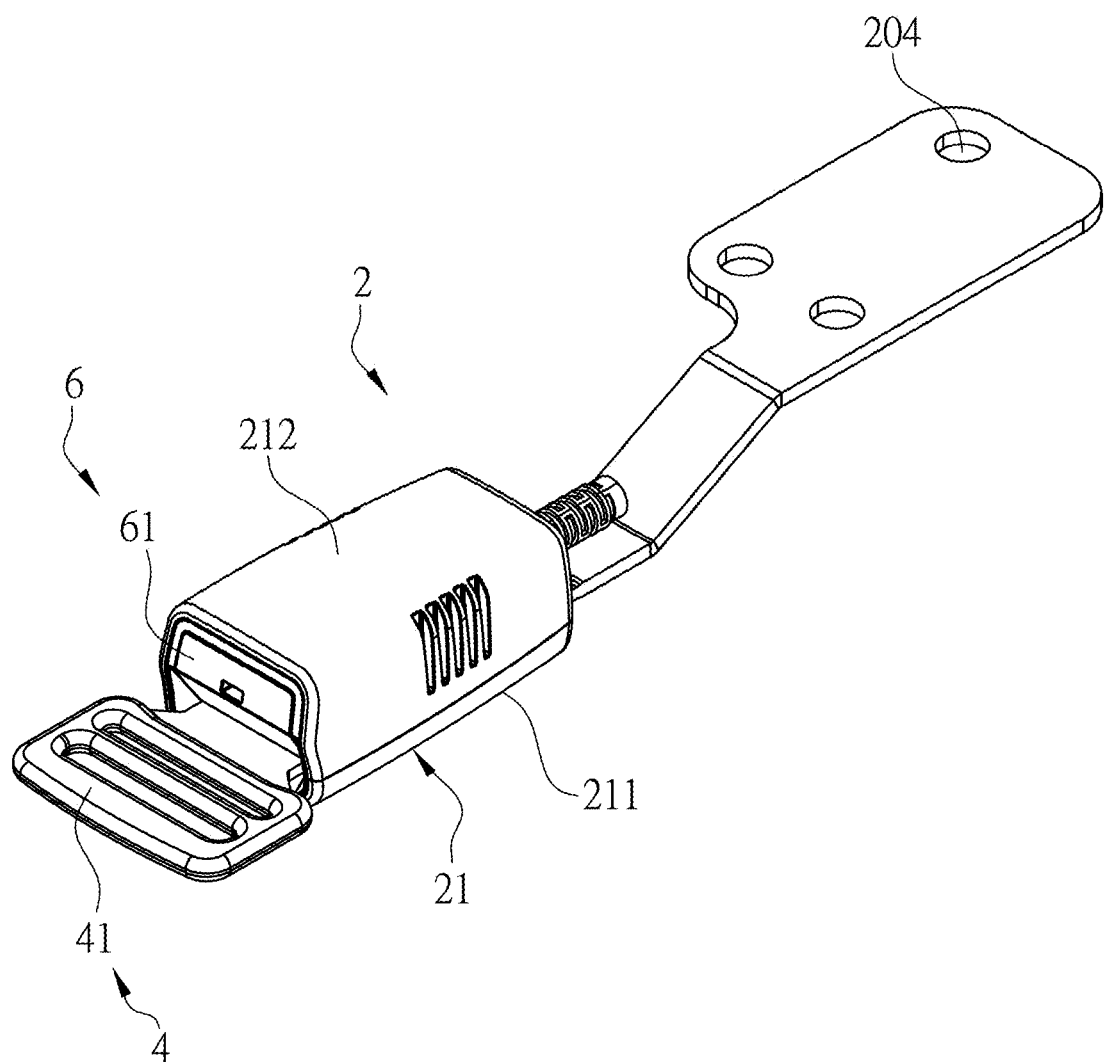
FIG. 2 is a schematic diagram illustrating a buckle device capable of displaying a locked state according to a first embodiment of the present invention.
Figure 3:
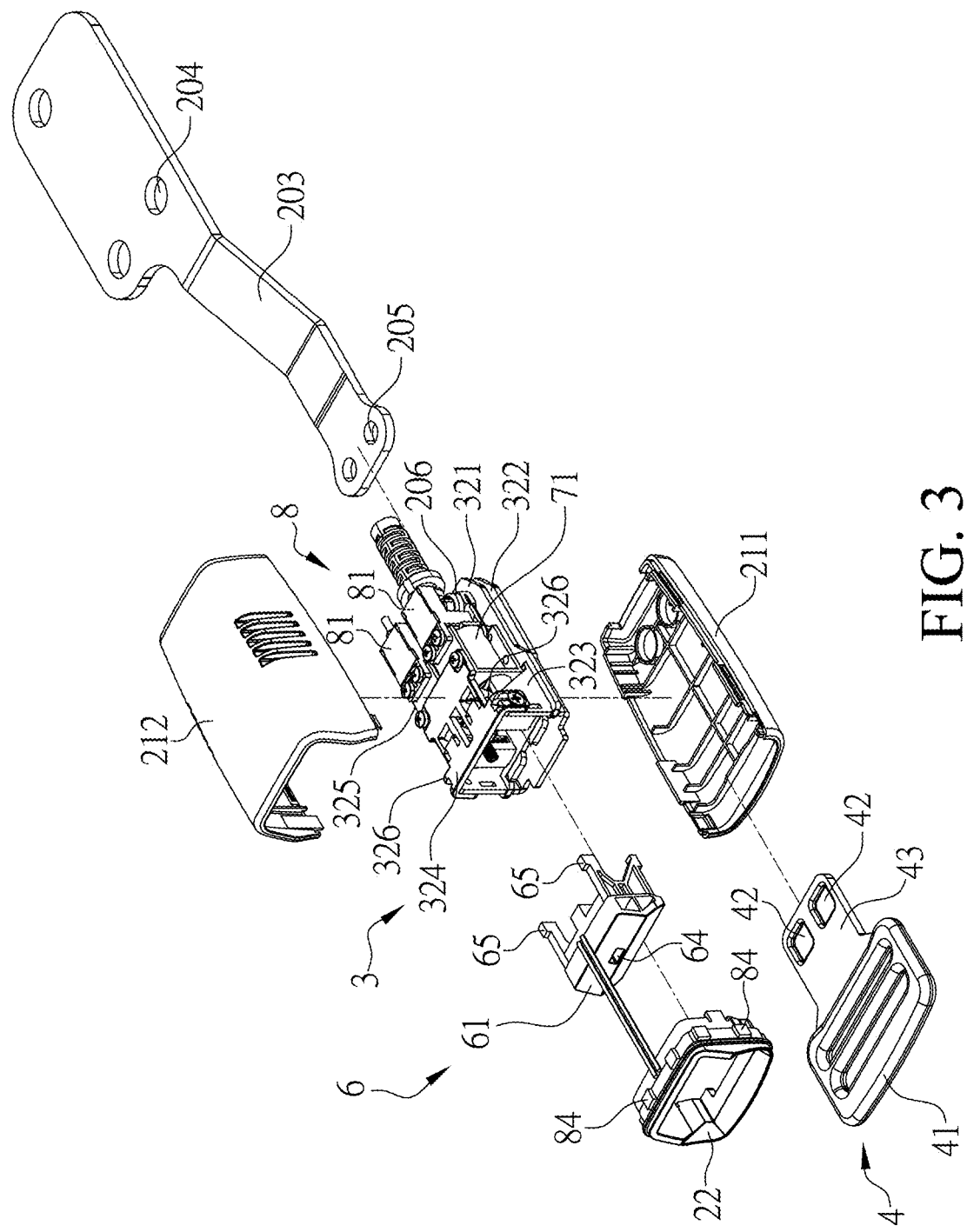
FIG. 3 is an exploded view illustrating the buckle device according to the first embodiment of the present invention.
Figure 4:
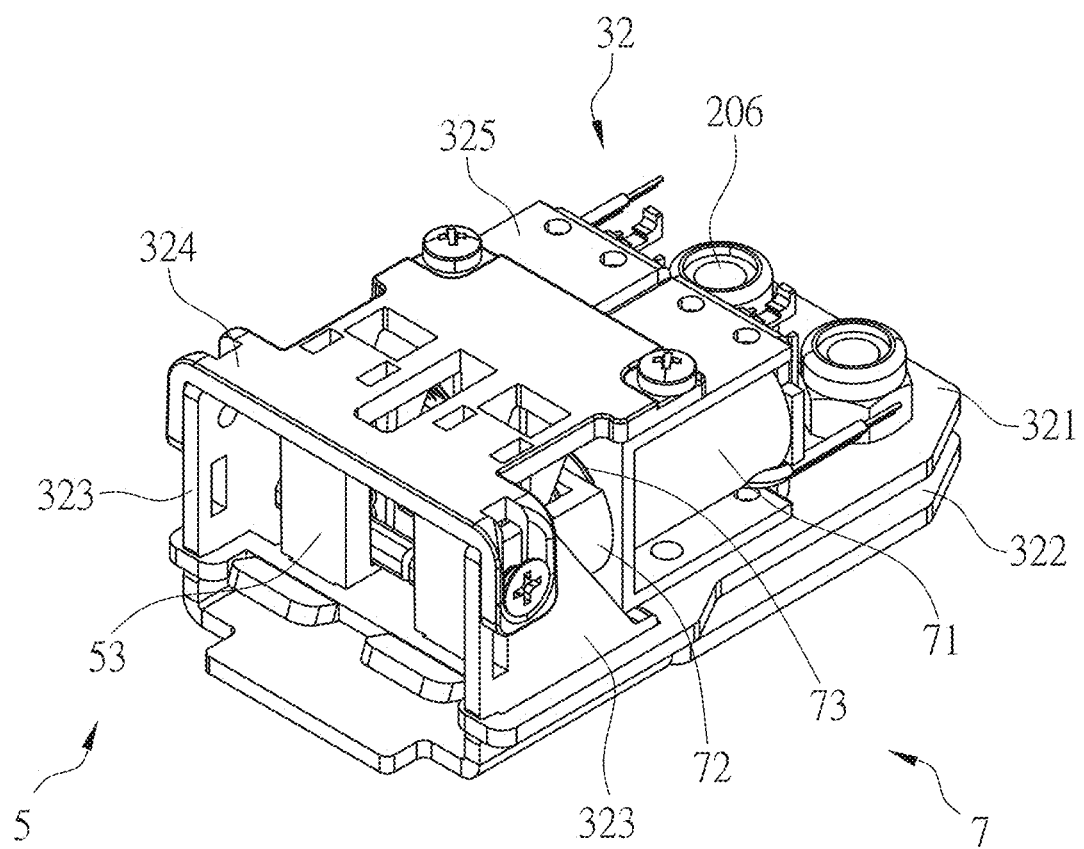
FIG. 4 is a perspective view illustrating a fastening unit and an electromagnetic unit of the buckle device according to the first embodiment of the present invention.
Figure 5:
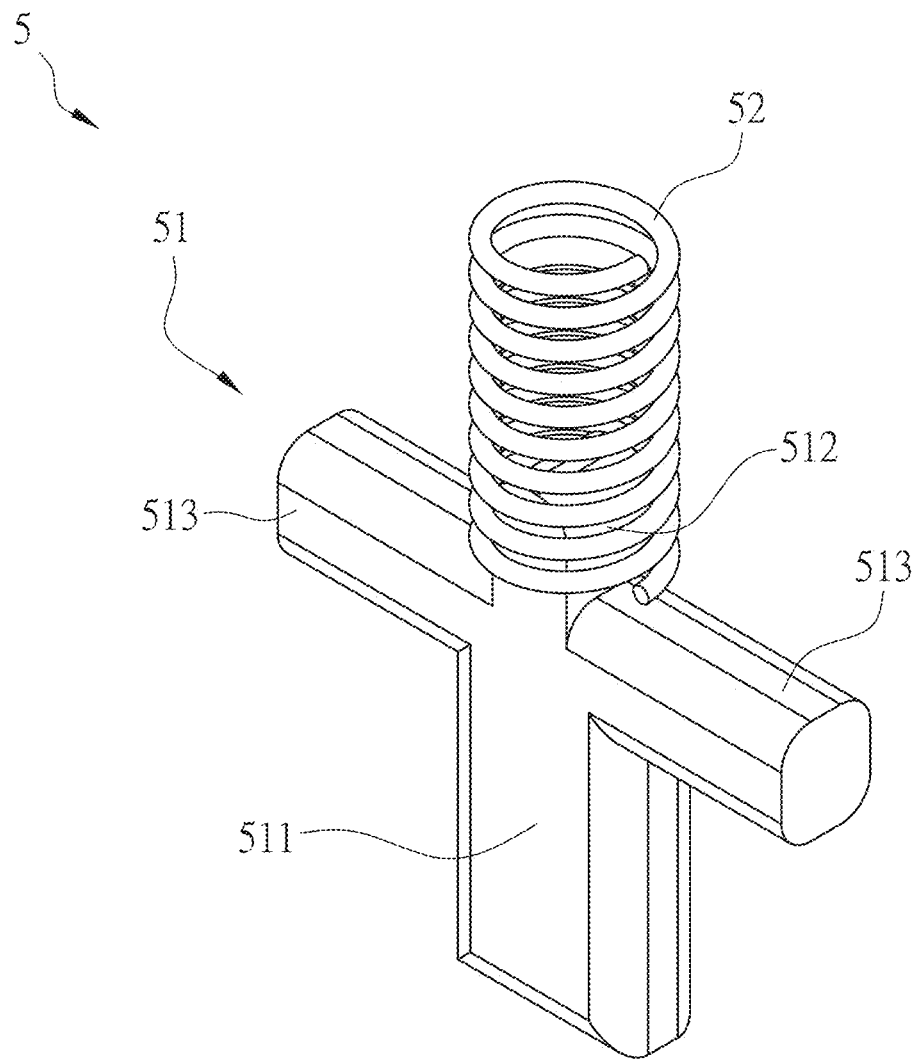
FIG. 5 is a perspective view illustrating a bolt body of the fastening unit according to the first embodiment of the present invention.
Figure 6:
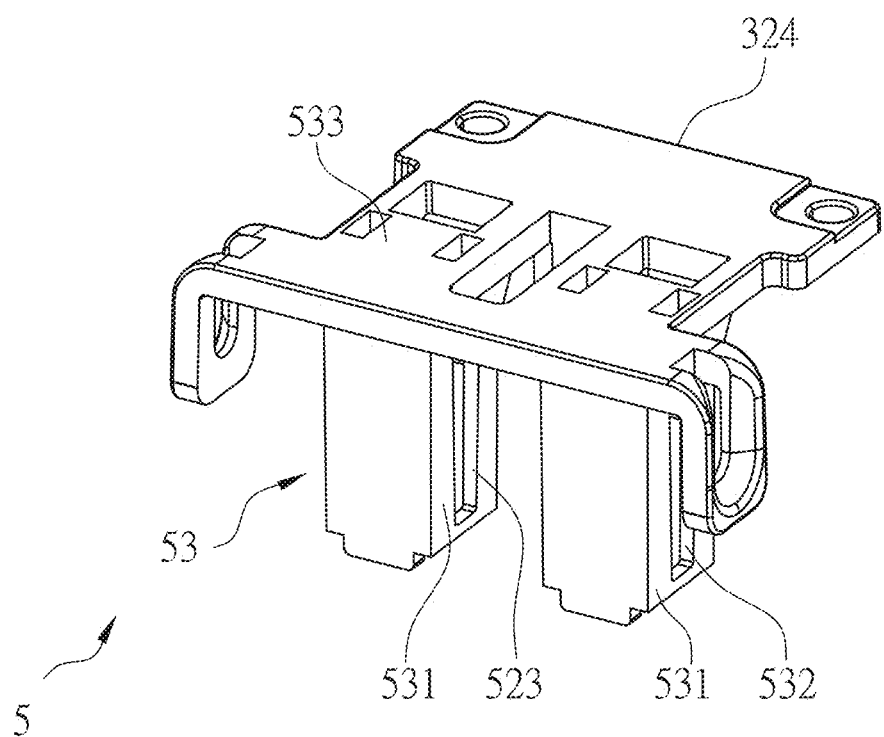
FIG. 6 is a perspective view illustrating a fastening guiding body of the fastening member according to the first embodiment of the present invention.
Figure 7:
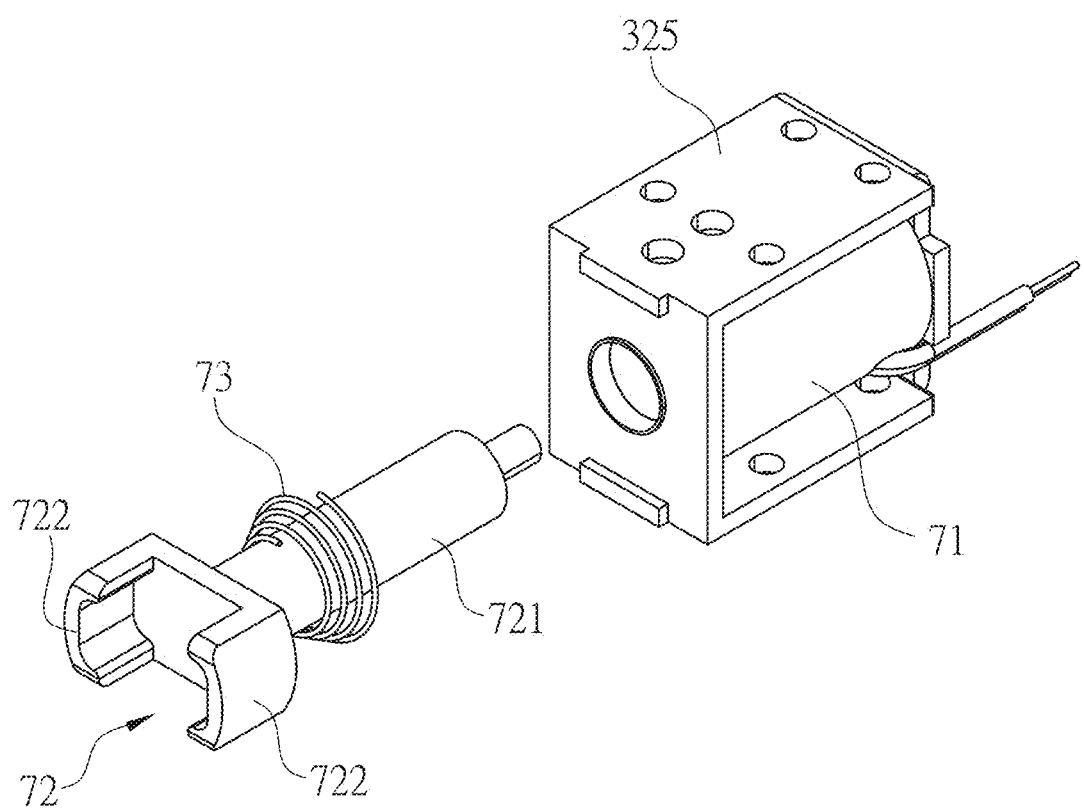
FIG. 7 is an exploded view illustrating the electromagnetic unit according to the first embodiment of the present invention.
Figure 8:
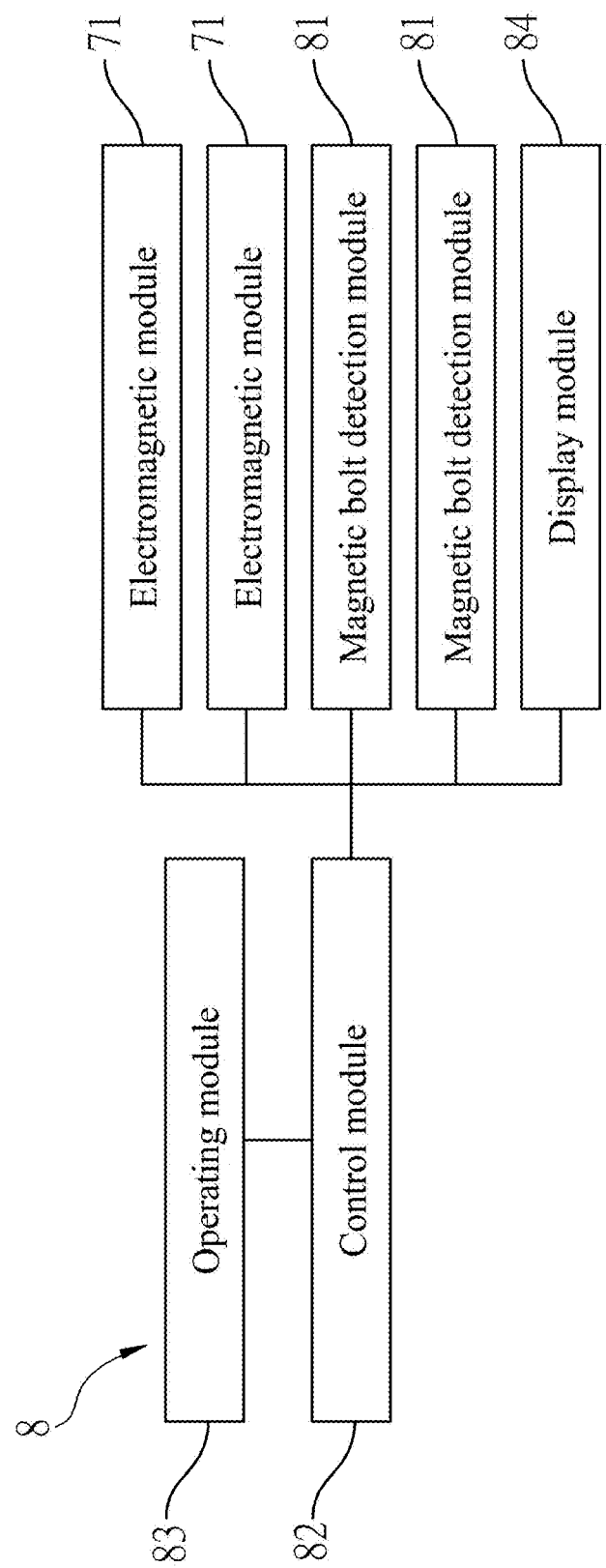
FIG. 8 is a diagram illustrating the device configuration, in which a control unit and the electromagnetic unit are disposed according to the first embodiment of the present invention.

Specific structural and functional details disclosed herein will become apparent from the following description of the exemplary embodiments of the invention taken in conjunction with the accompanying drawings, which provides a better understanding to a person having ordinary skill in the art but shall not be construed as limiting the invention. Wherever possible, the same reference numbers are used in the drawings and the description to refer to the same or like parts. It should be noted that similar elements are denoted by the same numbers.

Referring to FIGS. 2, 3, 4, 5, 6, 7, 8 and 9, a first embodiment of a buckle device 10 capable of displaying a locked state of the invention, comprises a case unit 2, a main unit 3, a latch unit 4, a fastening unit 5, a pressing unit 6, an electromagnetic unit 7 and a control unit 8.

The case unit 2 includes a housing 21. In the first embodiment, the housing 21 comprises a first outside casing 211 and a second outside casing 212. Specifically, the housing 21 can be other structures, and should not be limited to the exemplary embodiment. The main unit 3, the latch unit 4, the fastening unit 5 and the pressing unit 6 are accommodated in the housing 21. The first outside casing 211 and the second outside casing 212 are protective housings of the buckle device 10, and can prevent the internal components of the buckle device 10 from interference of external forces. The internal components of the buckle device can also be prevented from causing damage.

In the first embodiment, the buckle device 10 is connected to a mount extender 203. A plurality of mounting holes 204 and a plurality of locking holes 205 are formed on the mount extender 203. The two locking holes 205 can be passed through by two locking components 206, such that the buckle device 10 can be fastened with the mount extender 203. The mounting holes 204 can fix the mount extender 203 on a seat (not shown), such that the buckle device 10 can be arranged on the seat. In addition, a belt (not shown) can be used to fix an occupant (not shown) on the seat. The seat is set on the amusement device, and the amusement device may move the seat, such that the belt and the buckle device are combined to become a safety belt and secure the occupant sitting in the seat. Since the amusement device with the seat belt is known to those skilled in the art, further details are omitted here for brevity.

The main body unit 3 comprises a main body 32 surrounding and defining an accommodating space 31, at least one first through hole 33 arranged on the main body 32, two sliders 34 arranged in the accommodating space 31, two slider elastic bodies 35 abutting against the sliders 34, two second through holes 36 arranged on the main body 32 and apart from the at least one first through hole 33, two plate through holes (not shown) arranged on the main body 32 and two sliding guiding bodies 38 (please refer to FIG. 16) arranged on the two sliders 34.

The main body 32 has a first plate 321, a second plate 322 spaced apart from the first plate 321, two third plates 323 spaced apart from each other and connected to the first plate 321 and the second plate 322, a fourth plate 324 connected to the two third plates 323 and spaced apart from the first plate 321, two electromagnetic fixing portions 325 arranged on the first plate 321, and a plurality of blocking portions 326 arranged on the fourth plate 324. The accommodating space 31 is defined by the first plate 321, the second plate 322 and the two third plates 323. In the present embodiment, two first through holes 33 are formed on the first plate 321, and the two second through holes 36 are formed on the second plate 322.

The two third plates 323 and the second plate 322 are the same metal plates and are bent, such that the two third plates 323 are arranged on two sides of the second plate 322. The two plate through holes are formed on the first plate 321 at intervals, and the two third plates 323 respectively pass through the two plate through holes and stand on two sides of the first plate 321. The fourth plate 324 is arranged on the top of the two third plates 323 and connected to the two third plates 323. The first plate 321 is spaced apart from and the fourth plate 324. The two electromagnetic fixing portions 325 and the fourth plate 324 are connected together. Two upper surfaces of the two sliders 34 are respectively defined as a first surface 39, and the two first surfaces 39 are toward the first plate 321.

The mount extender 203 is located between the first plate 321 and the second plate 322. The first plate 321, the mount extender 203, and the second plate 322 are locked together with the two locking components 206. The distance between the first plate 321 and the second plate 322 is the height of the accommodating space 31, and the thickness of the two sliders 34 fits in with the height of the accommodating space 31, such that the two sliders 34 can slide in the accommodating space 31. The two sliding guide bodies 38 are two protruding blocks arranged on two bottom surfaces of the two slides 34, respectively. Two blocking portions 327 (please refer to FIG. 16) are arranged on the second plate 322, and the two blocking portions 327 are configured to support the two sliding guiding bodies 38, in order to limit the sliding range of the two sliders 34 in the accommodating space 31.

The latch unit 4 comprises a tongue element 41 detachably arranged in the accommodating space 31, two tongue openings 42 formed on the tongue element 41, and a second surface 43 arranged on the tongue element 41. When the tongue element 41 enters the accommodating space 31, the second surface 43 is toward the first plate 321. The tongue element 41 detachably abuts against the sliders 34.

The thickness of the tongue element 41 is matched with the height of the accommodating space 31. Therefore, when the tongue element 41 enters the accommodating space 31, the two first surfaces 39 are consistent with the second surface 43 in height. The tongue element 41 is slidable in the accommodating space 31. The left side of the accommodating space 31 communicates with the external space, such that the tongue element 41 can be inserted into the accommodating space 31 from the external space. The tongue element 41 can also be removed from the accommodating space 31.

Figure 9:
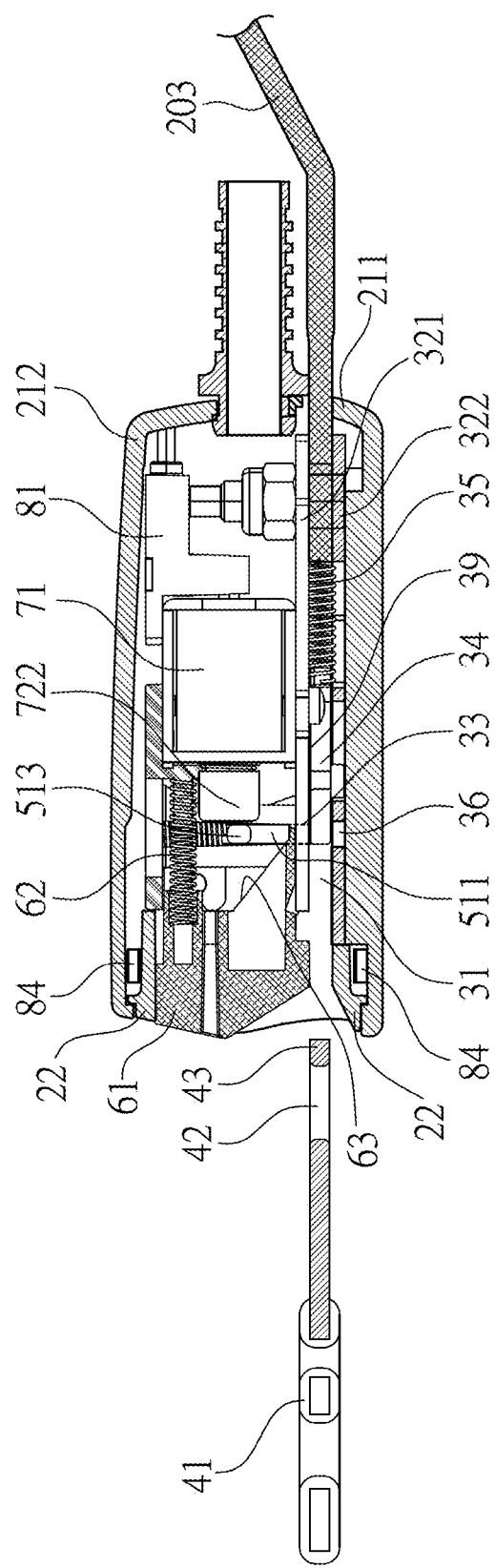
FIG. 9 is a schematic side view illustrating a latch unit separated from a main unit according to the first embodiment of the present invention.
Figure 10:
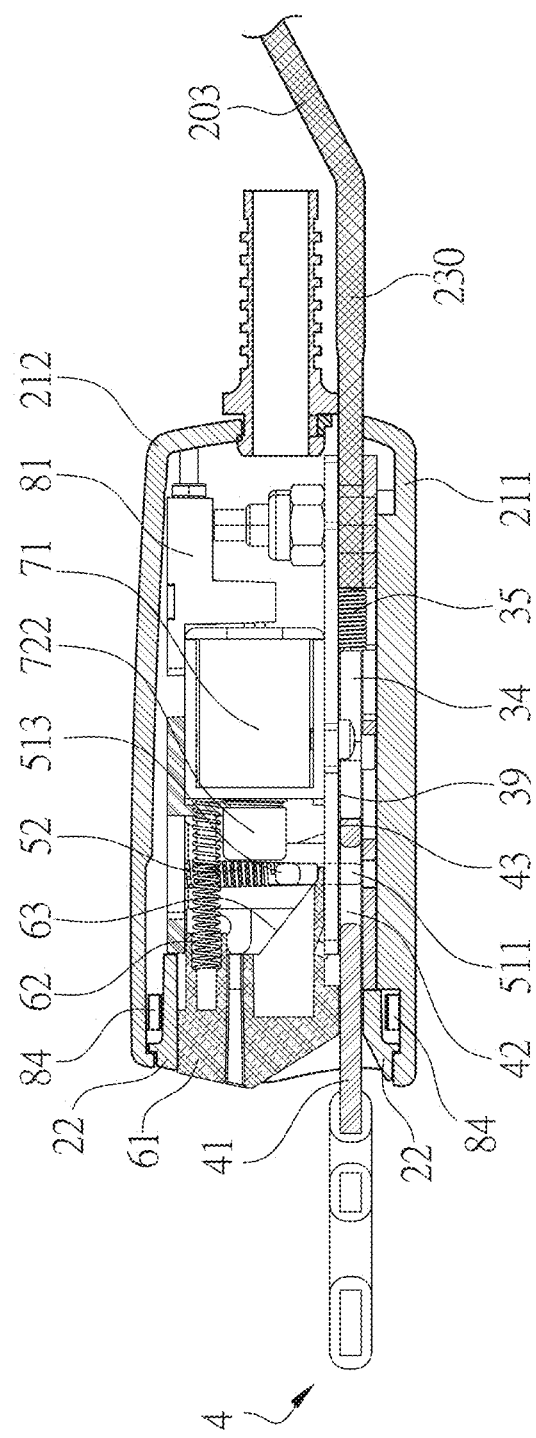
FIG. 10 is a schematic side view illustrating the latch unit inserting to the main unit according to the first embodiment of the present invention.

Please refer to FIG. 9 in conjunction with FIG. 10. In the first embodiment, the vertical length of the slider elastic body 35 is greater than the vertical length of the accommodating space 31. Therefore, two openings are formed on the first plate 321 and the second plate 322, respectively. The two openings are configured to fix the two slider elastic bodies 35. The shape of the opening is rectangular substantially, and the length of the opening is equal to the length of the slider elastic body 35. The width of the opening is smaller than the width of the slider elastic body 35, such that the first plate 321 and the second plate 322 on the side of the opening can fix the slider elastic body 35 on the upper and lower sides. Wherein, the first plate 321 and the second plate 322 arranged on the right side of the plurality of openings may support the right side of the two slider elastic bodies 35. The left sides of the two slider elastic bodies 35 abut against the right sides of the two sliders 34, respectively, such that the elastic forces of the two slider elastic bodies 35 can push the two sliders 34 to slide to the left in the accommodating space 31. Alternatively, the two sliders 34 are pushed by an external force to slide to the right in the accommodating space 31 and compress the two slider elastic bodies 35. Specifically, the two slider elastic bodies 35 can be fixed by other structures, and the present invention is not limited thereto.

The fastening unit 5 includes two bolt bodies 51 arranged in the two first through holes 33, two bolt elastic bodies 52 connected to the two bolt bodies 51, and two fastening guide bodies 53 connected to the bolt bodies 51. The two fastening guide bodies 53 respectively have two side walls 531 connected to the first plate 321, two guiding portions 532 respectively arranged on the two side walls 531, and a top wall 533 connected to the two side walls 531. Each of the bolt bodies 51 has a fastening portion 511 arranged in the first through hole 33, a protruding portion 512 connected to the fastening portion 511, and two wings 513 connected to the protruding portion 512. The fastening portion 511 can extend into the accommodating space 31 and the second through holes 36. The protruding portion 512 is arranged between the two side walls 531. The two wings 513 protrude outward from the two guiding portions 532, respectively.

In the first embodiment, the fourth plate 324 and the two fastening guide bodies 53 are integrally formed in one structure, but can also be separated into individual structures, specifically. The bolt elastic body 52 can be arranged on the protruding portion 512. The front and rear sides of the two side walls 531 are connected to each other and define a space for accommodating the bolt elastic body 52, in order to prevent the bolt elastic body 52 from contacting with other spring structures. The top end of the bolt elastic body 52 abuts against the fourth plate 324, and the bottom end of the bolt elastic body 52 is sleeved on the protruding portion 512, such that the bolt elastic body 52 can push the bolt body 51 downward.

When the tongue element 41 is separated from the two sliders 34, the two sliders 34 are pushed by the two slider elastic bodies 35, such that the positions of the two sliders 34 are located below the two first through holes 33, respectively. The first surfaces 39 of the two sliders 34 abut against the bottom ends of the fastening portions 511 of the two bolt bodies 51, in order to block the fastening portions 511 of the two bolt bodies 51 from entering the accommodating space 31.

When the tongue element 41 is in contact with the two sliders 34, the tongue element 41 can be pushed by an external force and move the two sliders 34, such that the two sliders 34 are separated from the two first through holes 33. The two bolt elastic bodies 52 push the fastening portions 511 of the two bolt bodies 51 into the accommodating space 31, and the fastening portions 511 of the two bolt bodies 51 penetrate through the two tongue openings 42 of the tongue element 41. At this time, the two bolts 51 interfere with the tongue element 41 to prevent the tongue element 41 from leaving the accommodating space 31.

Since the mount extender 203 is located between the first plate 321 and the second plate 322 and the distance between the first plate 321 and the second plate 322 is determined by the thickness of the mount extender 203, the thickness of the accommodating space 31 is the same as the thickness of the mount extender 203. The thickness of the tongue element 41 and the two sliders 34 matches the distance between the first plate 321 and the second plate 322. Therefore, the tongue element 41 and the two sliders 34 can slide stably along the horizontal direction in the accommodating space 31. For example, the thickness of the tongue element 41 and the two sliders 34 are equal, and the thickness of the tongue element and the slider is less than the distance between the first plate 321 and the second plate 322 by 0.01 centimeter (cm). The bottom surface of the first plate 321 and the top surface of the second plate 322 can clamp the tongue element 41 and the two sliders 34. Specifically, the distance between the first plate 321 and the second plate 322 and the thickness of the tongue element 41 and the two sliders 34 should be set according to the actual mechanical structure, and the present invention is not limited thereto.

The first plate 321 and the second plate 322 can clamp the two sliders 34, such that the two sliders 34 can slide stably in the accommodating space 31. When the tongue element 41 enters the accommodating space 31, the first plate 321 and the second plate 322 can clamp the tongue element 41, such that the tongue element 41 can slide stably in the accommodating space 31.

When the tongue element 41 abuts against the two sliders 34 and all of them slide in the accommodating space 31, the two bolt bodies 51 are supported by the tongue element 41 and the two sliders 34, alternately. The two bolt bodies 51 enter the accommodating space 31 and extend into the two second through holes 36 only when extending into the two tongue openings 42. Otherwise, the two bolt bodies 51 are supported by the tongue element 41 and the two sliders 34, such that the two bolt bodies 51 cannot enter the accommodating space 31.

For example, when the tongue element 41 enters the accommodating space 31 and it abuts against the two sliders 34 and is pushed by an external force, the two sliders 34 are pushed away from a place under the two first through holes 33 by the tongue element 41 and the tongue element 41 is moved to the bottom of the two first through holes 33. When the tongue element 41 and the two sliders 34 slide in the accommodating space 31, the two bolt bodies 51 slide from the first surfaces 39 of the two sliders 34 to the second surface 43 of the tongue element 41, such that the tongue element 41 abuts against the two bolt bodies 51, to prevent the two bolt bodies 51 from entering the accommodating space 31. When the two tongue openings 42 do not reach the sides of the two first through holes 33 and the external force applied to the tongue element 41 is removed, the two sliders 34 and the tongue element 41 are pushed by the two slider elastic bodies 35. Therefore, the tongue element 41 is pushed away from the sides of the two first through holes 33, and the two sliders 34 follow to the sides of the two first through holes 33. When the tongue element 41 and the two sliders 34 slide in the accommodating space 31, the two bolt bodies 51 slide from the second surface 43 of the tongue element 41 to the first surfaces 39 of the two sliders 34, such that the two sliders 34 abut against the two bolt bodies 51 to prevent the two bolt bodies 51 from entering the accommodating space 31.

It is worth mentioning that the two first through holes 33 are formed on the first plate 321, the two second through holes 36 are formed on the second plate 322, and the position of the two second through holes 36 corresponds to the two first apertures 33. When the fastening portions 511 of the two bolt bodies 51 enter the accommodating space 31, the fastening portions 511 penetrate through the two tongue openings 42, and further through the two second through holes 36.

The fastening portions 511 of the two bolt bodies 51 penetrate through the two first through holes 33 and the two second through holes 36, respectively. With the supporting force applied by the two first through holes 33 and the two second through holes 36, the fastening portions 511 of the two bolt bodies 51 can abut against the two tongue openings 42 of the tongue element 41. Therefore, the lateral pulling force of the latch unit 4 can be effectively resisted, and the structural strength of the buckle device can be improved.

The pressing unit 6 comprises a pressing body 61 arranged on the main body 32, a pressing elastic body 62 connected to the pressing body 61, two supporting surfaces 63 arranged on the pressing body 61, a release hole 64 formed on the pressing body 61, and multiple limiting protrusions 65 arranged on the pressing body 61. Wherein, the pressing body 61 disposed among the first plate 321, the two third plates 323, and the fourth plate 324.

In the first embodiment, a see-through portion 22 is arranged around the pressing body 61. A plurality of display modules 84 are arranged on the see-through portion 22 and each display module is a light emitting diode (LED). The plurality of display modules 84 can be controlled to emit light, and the emitted light is transmitted through the see-through portion 22 to the outside, which can indicate the position of the pressing body 61.

Figure 12:
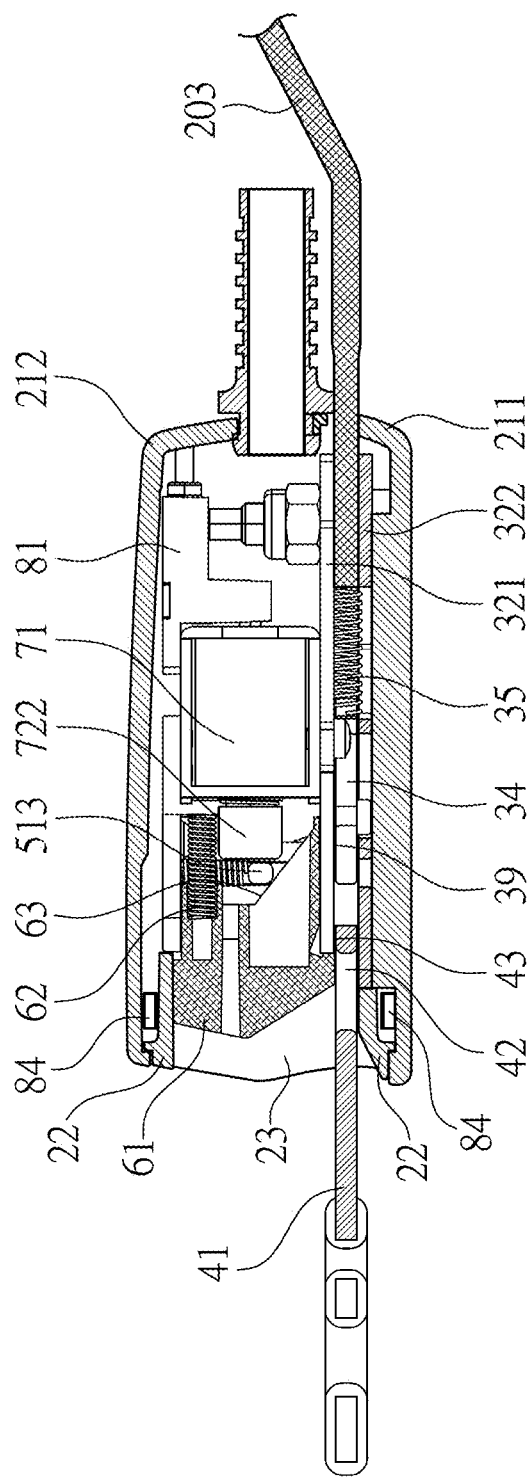
FIG. 12 is a schematic side view illustrating the electromagnetic unit located at a release position in which a pressing unit is pressed to push the bolt body away from the latch unit according to the first embodiment of the present invention.

The pressing body 61 can be moved between a first position (as shown in FIG. 9) and a second position (as shown in FIG. 12). When the two sliders 34 abut against the bottom end of the fastening portions 511 of the two bolt bodies 51, the pressing body 61 is pushed to the first position by the pressing elastic body 62 and is spaced apart from the wings 513 of the two bolt bodies 51. When the pressing body 61 is located at the first position, the fastening portions 511 of the two bolt bodies 51 can be pushed into the accommodating space 31.

When the two bolt bodies 51 enter the accommodating space 31, the wings 513 of the two bolt bodies 51 abut against the two supporting surface 63 on the pressing body 61, and the pressing body 61 can be moved to the second position after being pressed by an external force. When the pressing body 61 is moved from the first position to the second position, the supporting surface 63 of the pressing body 61 can support the wings 513 of the two bolt bodies 51, such that the fastening portions 511 can be removed from the accommodating space 31.

The position of the multiple limiting protrusions 65 corresponds to the position of the plurality of blocking portions 326. The plurality of limiting protrusions 65 respectively abut against the plurality of blocking portions 326, to limit the moving range of the pressing body 61 in the main unit 3. Two opposite sides of the pressing elastic body 62 respectively abut against the pressing body 61 and the electromagnetic fixing portion 325 to push the pressing body 61 to the left. In the present embodiment, there are two sets of the limiting protrusions 65 and the blocking portions 326, but the present invention is not limited thereto.

The electromagnetic unit 7 includes two electromagnetic modules 71 arranged on the main body 32, two electromagnetic rods 72 disposed on the two electromagnetic modules 71, and two rod elastic bodies 73 abut against the two electromagnetic rods 72. The two electromagnetic rods 72 respectively have a magnetic part 721 arranged in the electromagnetic module 71 and two blocking parts 722 connected to the magnetic part 721.

Each of the two electromagnetic modules 71 is an electromagnetic coil structure, and the appearance of the structure is a cylinder with a hole. The two electromagnetic modules 71 are respectively arranged in the two electromagnetic fixing portions 325. The magnetic parts 721 of the two electromagnetic rods 72 are respectively arranged in the hole of the two electromagnetic modules 71, and can be moved by the electromagnetic action of the two electromagnetic modules 71, respectively. Since moving the magnetic attractor by the electromagnetic action is known to those skilled in the art, further description is omitted here for simplicity.

Figure 11:
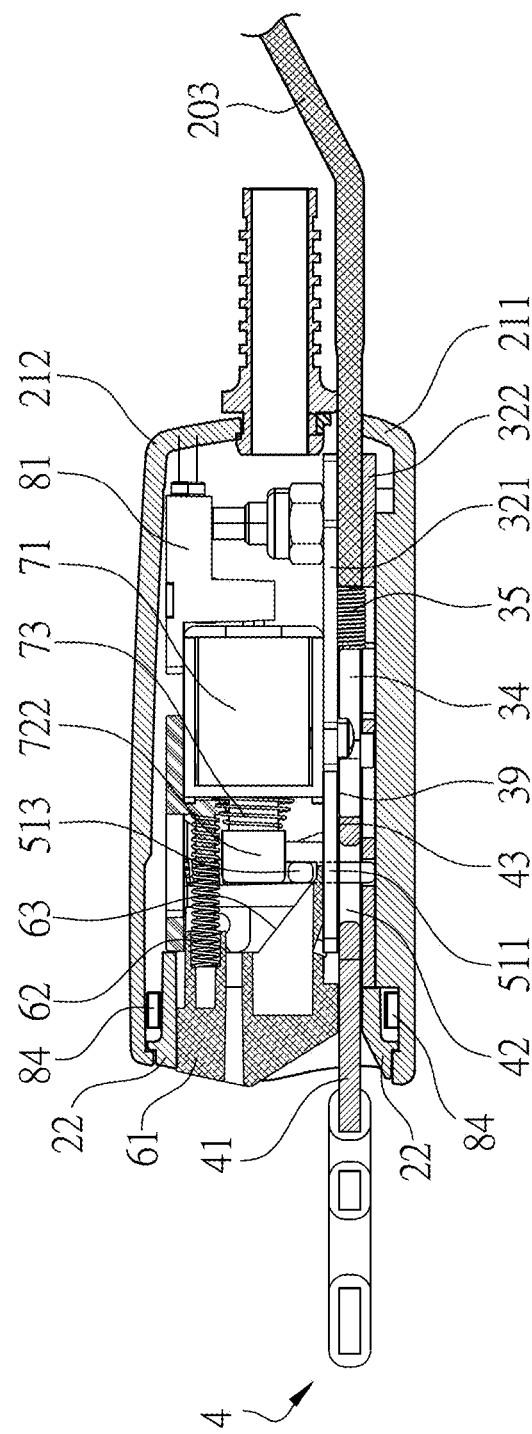
FIG. 11 is a schematic side view illustrating the electromagnetic unit located at a lock position and interfering with the bolt body according to the first embodiment of the present invention.

The electromagnetic rod 72 can be moved between a release position (as shown in FIG. 10) and a lock position (as shown in FIG. 11). When the two electromagnetic modules 71 are excited, the two electromagnetic rods 72 is moved to the release position, to separate the two electromagnetic rods 72 and the two bolt bodies 51 from each other. When the electromagnetic rods 72 is located at the release position, the pressing body 61 can be moved to the lock position, and the two bolt bodies 51 can be removed from the accommodating space 31.

When the two bolt bodies 51 enter the accommodating space 31 and the two electromagnetic modules 71 are not excited, the two electromagnetic rods 72 are pushed by the two rod elastic bodies 73 respectively to the lock position. The two electromagnetic rods 72 respectively interfere with the two bolt bodies 51, in order to prevent the pressing body 61 from pushing the two bolt bodies 51 out of the accommodating space 31.

Preferably, the two rod elastic bodies 73 are respectively disposed between the two blocking parts 722 and the electromagnetic modules 71, such that the two electromagnetic rods 72 can be pushed to the lock position. The two electromagnetic rods 72 is moved to the release position when the two electromagnetic modules 71 are excited. Specifically, the two rod elastic bodies 73 may be other elastic structures, and the present invention is not limited thereto.

The control unit 8 comprises a magnetic bolt detection module 81 disposed in the electromagnetic fixing portions 325 of the main body 32, and a control module 82 electrically connected to the magnetic bolt detection module 81, an operating module 83 electrically connected to the control module 82 and a display module 84 electrically connected to the control module 82. The magnetic bolt detection module 81 is configured to detect the position of the two electromagnetic rods 72. Wherein, the control module 82 is electrically connected to the electromagnetic module 71, and the control module 82 can control a power state of the electromagnetic module 71 such that the control module 82 controls whether the electromagnetic module 71 is excited or not.

When the electromagnetic module 71 is excited, a magnetic force can be generated and applied on the electromagnetic rod 72 to move the electromagnetic rod 72 to the release position, such that the electromagnetic rod 72 and the bolt body 51 are spaced apart from each other. When the bolt body 51 enters the accommodating space 31 and the electromagnetic module 71 is not excited, the rod elastic body 73 pushes the electromagnetic rod 72 to the lock position, such that the electromagnetic rod 72 and the bolt body 51 interfere with each other to prevent the bolt body 51 from leaving the accommodating space 31.

In the present embodiment, the control module 82 is a microcontroller that can run a program to control the amusement device. The buckle device is arranged on a seat in the amusement device. The operating module 83 comprises an operation panel. The display module 84 comprises a plurality of display lights. Preferably, the operating module 83 and the display module 84 are two touch screens, which should not be construed as limiting the invention. In addition, the control module 82 can also be electrically connected to multiple buckle devices on seats, respectively, in order to monitor the safety state of the occupants on the seats.

In the first embodiment, each of the two magnetic bolt detection modules 81 is an infrared detector, which can determine the position of the two electromagnetic rods 72 by detecting whether the infrared ray is blocked or not. For example, when the two electromagnetic modules 71 are excited, the blocking parts 722 of the two electromagnetic rods 72 are far away from the bolt bodies 51. At the same time, the magnetic parts 721 of the two electromagnetic rods 72 is moved to the right, and the infrared rays output by the two magnetic bolt detection modules 81 will be blocked. As a result, the magnetic bolt detection modules 81 can obtain the information that the two electromagnetic rods 72 are located at the release position. When the two electromagnetic modules 71 are not excited, the two electromagnetic rods 72 are pushed by the two rod elastic bodies 73 to the left, such that the two electromagnetic rods 72 are far away from the two magnetic bolt detection modules 81, and the infrared ray output by the two magnetic bolt detection modules 81 is not be blocked. In this way, the control module 82 can obtain information that the two electromagnetic rods 72 are located at the lock position. Those skilled in the art should understand that the infrared detector can be replaced by any detection means that can achieve the same effect, including but not limited to photoelectric, inductive or mechanical detectors. In the present embodiment, the two magnetic bolt detection modules 81 are respectively fastened on the two electromagnetic fixing portions 325 to detect the position of the two electromagnetic rods 72. Specifically, this should not be construed as limiting the invention.

The operating module 83 can control the control module 82 to control whether the two electromagnetic modules 71 are powered on or not, and the display module 84 can display a current state of the buckle device. For example, when the operator operates the operating module 83 to make the control module 82 control the two electromagnetic modules 71 to be excited, the display module 84 displays "the electromagnetic coil is powered on". When the two electromagnetic modules 71 are excited and the magnetic force moves the two electromagnetic rods 72 to the release position, the display module 84 displays "the buckle device is in release state". When the operator operates the operating module 83 to make the control module 82 control the two electromagnetic modules 71 to be not excited, the display module 84 displays "the electromagnetic coil is powered off". When the two electromagnetic modules 71 are not excited and the rod elastic body 73 pushes the two electromagnetic rods 72 to the lock position, the display module 84 displays "the buckle device is in locked state". Specifically, the display module 84 can output information in other ways, which should not be limited thereto.

In the first embodiment, two sets of the slider 34, the fastening unit 5, and the electromagnetic unit 7 are provided. As long as one of the mechanical structures fails, the detection information can be transmitted to the control module 82 by the two magnetic bolt detection modules 81, such that the control module 82 can send a warning signal through the operating module 83 and stop the operation of the amusement device. Specifically, the slider 34, the fastening unit 5, and the electromagnetic unit 7 can be arranged in one set or three sets, and should not be limited to the exemplary embodiment.

When the buckle device of the invention is installed, the fastening unit 5 and the press unit 6 can be installed on the first plate 321, and then the fourth plate 324 can be fixed on the two third plates 323 and the electromagnetic fixing portion 325. In this way, the fastening unit 5 and the pressing unit 6 can be fixed among the first plate 321, the two third plates 323, and the fourth plate 324. Compared with the conventional buckle device with two vertical disks, the buckle device of the invention is relatively simple to install. When the inventor starts to assemble the product, the installation time of the buckle device with the vertical disk is about 3 to 4 hours, while the installation time of the buckle device of the invention is about 1 to 2 hours. The manufacturing time is significantly shortened, and the manufacturing output can be increased.

Referring to FIG. 9, when the tongue element 41 of the latch unit 4 does not enter the accommodating space 31, the first surfaces 39 arranged on the two sliders 34 are pushed by the two slider elastic bodies 35 to the place below the two first through holes 33. The two sliding guiding bodies 38 limit the positions of the two sliders 34, so the two sliders 34 do not be moved out of the accommodating space 31. At this time, the first surfaces 39 arranged on the two sliders 34 respectively abut against the bottoms of the fastening portions 511 of the two bolt bodies 51, in order to prevent the fastening portions 511 from entering the accommodation space 31.

The pressing body 61 is pushed to the first position by the pressing elastic body 62. When the tongue element 41 of the latch unit 4 does not enter the accommodating space 31, even if the pressing body 61 is pressed and moved to the second position, the fastening portions 511 of the bolt bodies 51 do not enter the accommodating space 31, such that the supporting surface 63 is not able to contact the wings 513 of the bolt bodies 51. The buckle device does not perform any operation.

The control module 82 supplies power to the electromagnetic modules 71, and the electromagnetic modules 71 is excited to generate magnetic force, such that the electromagnetic rods 72 can be moved to the release position. When the tongue element 41 of the latch unit 4 does not enter the accommodating space 31, even if the control module 82 turns off the power supply to the electromagnetic modules 71, the two blocking parts 722 of the electromagnetic modules 71 are blocked by the two wings 513 of the bolt bodies 51, such that the electromagnetic rod 72 cannot be moved to the lock position. At this time, the buckle device does not perform any operation, either.

Referring to FIG. 10, when the tongue element 41 of the latch unit 4 is pushed into the accommodating space 31, the two sliders 34 are pushed by the tongue element 41 and slide to the right. Since the height of the first surfaces 39 is the same as the height of the second surface 43, the surface that the bottom end of the fastening portion 511 of the bolt body 51 abuts against is changed from the first surfaces 39 to the second surface 43. The two tongue openings 42 are moved to the position below the fastening portions 511 of the two bolt bodies 51.

Since the two tongue openings 42 are located below the fastening portions 511 of the two bolt bodies 51, the positions of the two tongue openings 42 correspond to the two first through holes 33, and the fastening portions 511 of the two bolt bodies 51 are not supported by any object. The two bolt bodies 51 are pushed by the two bolt elastic bodies 52, respectively, such that the fastening portions 511 of the two bolt bodies 51 can enter the two tongue openings 42. In other words, the fastening portions 511 of the two bolt bodies 51 enter the accommodating space 31. At this time, the fastening portions 511 of the two bolt bodies 51 interfere with the tongue element 41, such that the tongue element 41 cannot leave the accommodating space 31.

Referring to FIG. 11, the control module 82 may be controlled to turn off the power supply to the two electromagnetic modules 71, and the two electromagnetic modules 71 do not generate magnetic force. Therefore, the two electromagnetic rods 72 are pushed to the left by the two rod elastic bodies 73 and are moved to the lock position.

When the two electromagnetic rods 72 are located at the lock position, the two blocking parts 722 of the two electromagnetic rods 72 are located above the two wings 513 of the two bolt bodies 51, such that the two blocking parts 722 interfere with the two wings 513, respectively. Therefore, the two bolt bodies 51 cannot be moved upward.

Since the two bolt bodies 51 interfere with the tongue element 41 and the two blocking parts 722 interfere with the two wings 513, respectively, the pressing body 61 cannot be pressed to the second position by an external force. Therefore, the tongue element 41 cannot be removed from the accommodating space 31, and the function of double locking can be achieved. In this way, the occupants sitting in the seat can be firmly fixed. In some amusement devices, the buckle device of the present invention can ensure the safety of the occupants sitting in the seat. The control module 82 starts the amusement device, only when both the two magnetic bolt detection modules 81 confirm that the two electromagnetic rods 72 enter the lock position, such that the occupants can be securely fixed on the seat.

If the control unit 8 loses power, the control module 82 cannot supply power to the two electromagnetic modules 71, and the occupants sitting in the seat cannot directly unlock the buckle device. At this time, a release object (not shown) is configured to force the buckle device to be unlock. The release object may be inserted through the release hole 64 to abut against the pressing body 61 and the two electromagnetic rods 72, such that the pressing body 61 and the two electromagnetic rods 72 are pushed at the same time. In this way, the two electromagnetic rods 72 are moved from the lock position to the release position, and the pressing body 61 is moved from the first position to the second position. Furthermore, the two bolt bodies 51 are moved upward to release the tongue element 41. Since the forced unlocking is known to those skilled in the art, further description is omitted here for simplicity.

Referring to FIG. 10, when the occupant wants to leave the seat, the control module 82 supplies power to the two electromagnetic modules 71. The two electromagnetic modules 71 generate magnetic force, and the magnetic parts 721 of the two electromagnetic rods 72 receive the magnetic force and move the two electromagnetic rods 72 to the release position. In this way, the two blocking parts 722 of the two electromagnetic rods 72 leave the position above the two wings 513 of the two bolt bodies 51, and the two electromagnetic rods 72 do not interfere with the two bolt bodies 51.

Referring to FIG. 12, the pressing body 61 is pressed by an external force, so the pressing body 61 is moved from the first position to the second position. At this time, the two support surfaces 63 arranged on the pressing body 61 respectively abut against one of the wings 513 of the two bolt bodies 51, and the two bolt bodies 51 are moved upward. The fastening portions 511 of the two bolt bodies 51 leave the accommodating space 31 and leave the two tongue openings 42, such that the two bolt bodies 51 do not interfere with the tongue element 41. The two sliders 34 are pushed by the first elastic body 35, and the tongue element 41 is moved to the left, so that the first surface 39 arranged on the two sliders 34 are located below the two first through holes 33.

Referring to FIG. 9, the external force applied on the pressing body 61 is released, and the pressing body 61 is pressed by the pressing elastic body 62 and moved from the second position to the first position. The tongue element 41 can be removed from the accommodating space 31 of the main unit 3 by the occupants. The bolt bodies 51 are moved by the bolt elastic bodies 52 to the accommodating space 31. At this time, the first surface 39 of the main unit 3 abuts against the bottom of the fastening portion 511 of the bolt bodies 51 to prevent the bolt body 51 from entering the accommodation space 31.

Figure 13:
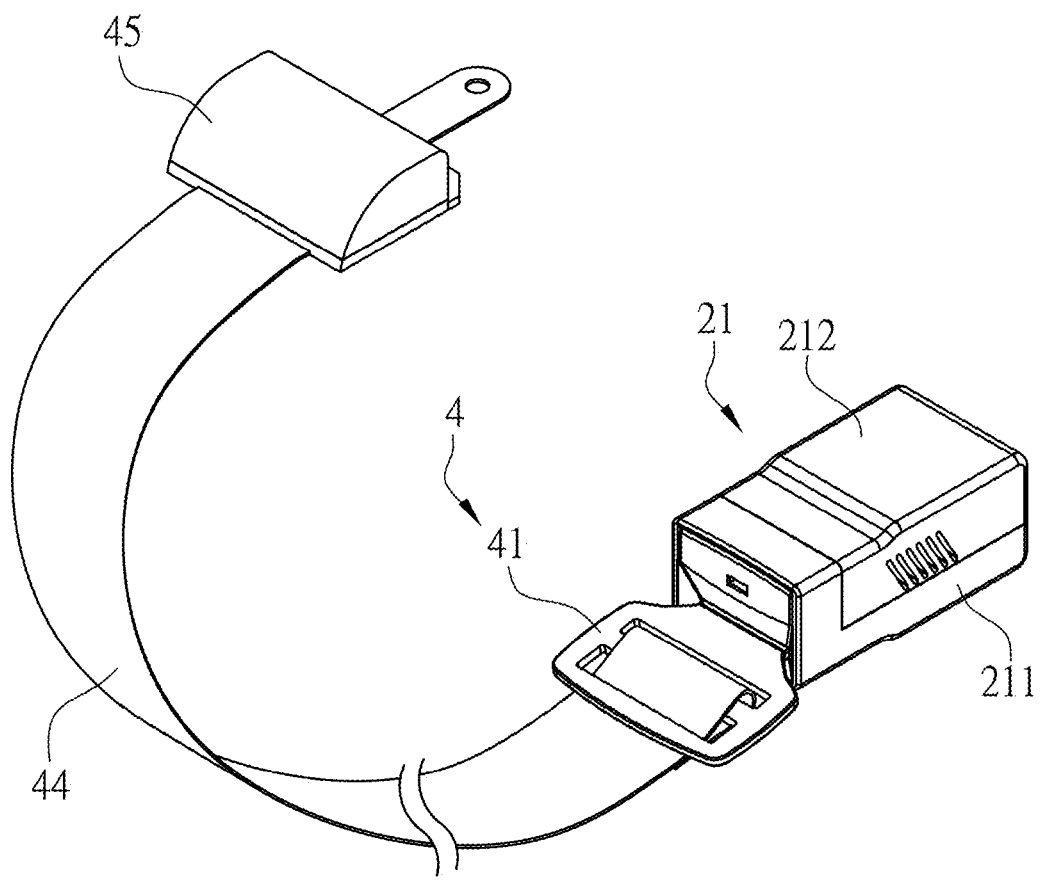
FIG. 13 is a perspective view illustrating a buckle device capable of displaying a locked state according to a second embodiment of the present invention.
Figure 14:
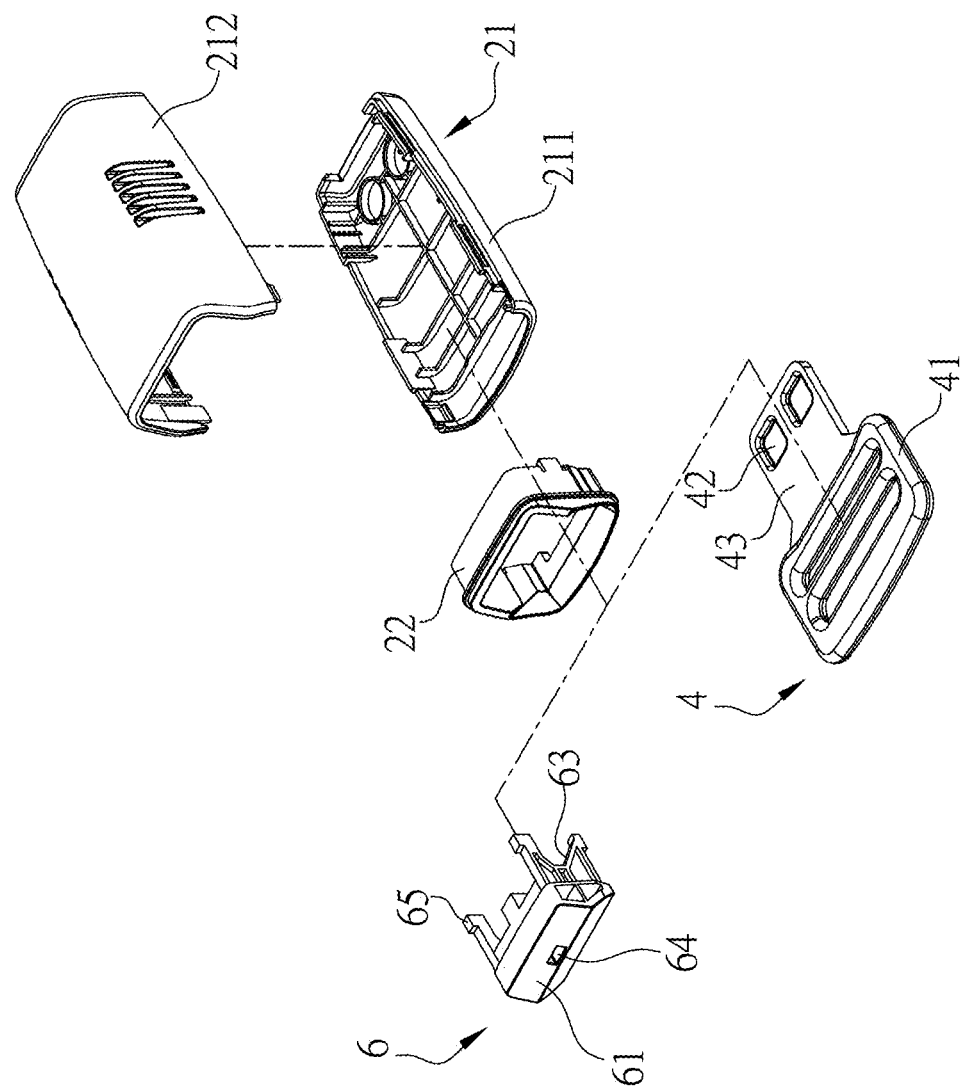
FIG. 14 is an exploded view illustrating the buckle device according to the second embodiment of the present invention.
Figure 15:
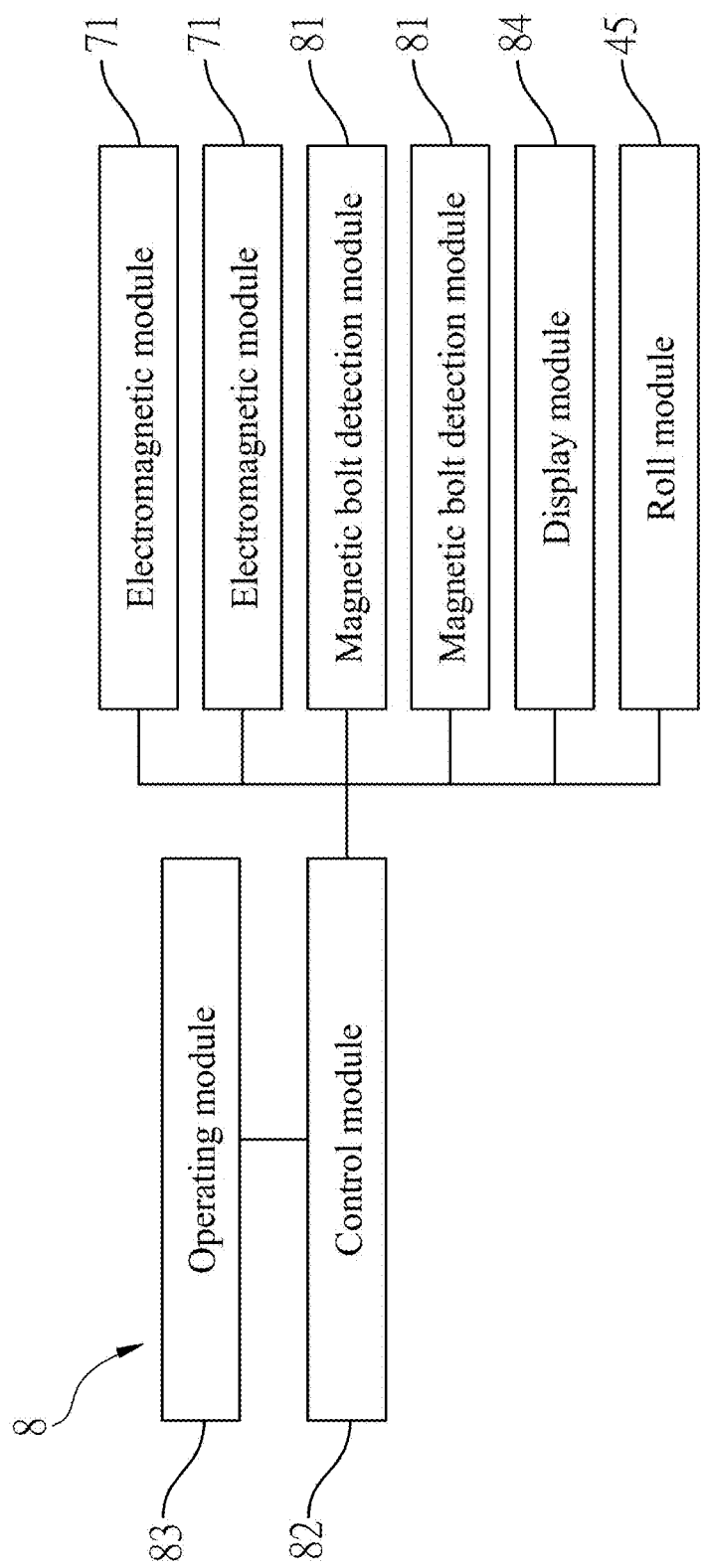
FIG. 15 is a diagram illustrating the device configuration, in which a roll module and a display module are disposed according to the second embodiment of the present invention.

Referring to FIG. 13, FIG. 14 and FIG. 15, FIGS. 13-15 are diagrams illustrating a buckle device capable of displaying a locked state according to a second embodiment of the present invention. The differences between the first embodiment and the second embodiment are that: the latch unit 4 further includes a reel 44 connected to the tongue element 41, and a roll module 45 connected to the reel 44 and electrically connected to the control module 82. The roll module 45 can roll the reel 44, and the reel 44 can also be pulled out from the roll module 45. The roll module 45 and the main body 32 are arranged on the left and right sides of the seat, respectively. When the tongue element 41 and the bolt body 51 interfere with each other, the reel 44 may bind the occupant to secure the occupant to the seat.

Referring to Table 1, the roll module 45 is a one-way electromagnet retracting structure. The control module 82 can turn on the power of the roll module 45 to control the roll module 45 to be excited, and the control module 82 can turn off the power of the roll module 45 to control the roll module 45 to be not excited. When the control module 82 controls the roll module 45 to be not excited, the roll module 45 clamps the reel 44 in one direction (locked state). At this time, the roll module 45 can rewind the reel 44, but the reel 44 cannot be pulled out from the roll module 45. When the control module 82 controls the roll module 45 to be excited (release state), the roll module 45 does not clamp the reel 44, such that the roll module 45 can rewind the reel 44, and the reel 44 can be pulled out from the roll module 45.

TABLE 1

| Roll module (no signal detection) | State of reel |
|---|---|
| The electromagnet is powered off (locked state) | Not able to be pulled out/able to rewind |
| The electromagnet is powered on (release state) | Able to be pulled out/able to rewind |

Referring Table 2, in the second embodiment, when the bolt body 51 does not interfere with the tongue element 41 and the at least one electromagnetic rod 72 is in the release position and the roll module 45 is excited, represents that the occupant has not inserted the tongue element 41 into the accommodating space 31. At this time, the control module 82 controls the electromagnetic module 71 to be excited or not excited, and the electromagnetic rod 72 may only be limited in the release position. The control module 82 controls the roll module 45 to be excited, and the display module 84 displays first state information. When the bolt body 51 interferes with the tongue element 41 and the electromagnetic module 71 is not excited and the roll module 45 is excited, represents that the occupant has inserted the tongue element 41 into the accommodating space 31, and the control module 82 controls the electromagnetic module 71 to be not excited. However, the roll module 45 is still controlled to be excited. At this time, the occupant can still adjust the length of the reel 44, and the display module 84 displays second state information. When the bolt body 51 interferes with the tongue element 41 and the electromagnetic module 71 is not excited and the roll module 45 is not excited, represents that the occupant inserts the tongue element 41 into the accommodating space 31, and the control module 82 controls the electromagnetic module 71 and the roll module 45 to be not excited. At this time, the occupant can no longer pull out the reel 44 from the roll module 45. The display module 84 displays third state information.

TABLE 2

| | First state information | Second state information | Third state information |
|---|---|---|---|
| Display module output light effect | (e.g., breathing light) | (e.g., constant light) | (e.g., extinction light) |
| State of tongue element | Not insert | Insert | Insert |
| State of electromagnetic module | Excited/not excited | Not excited | Not excited |
| State of roll module | Excited | Excited | Not excited |

In the second embodiment, the display module 84 comprises multiple light-emitting elements disposed on the main body 32. Preferably, the multiple light-emitting elements are full-color light-emitting diodes (RGB LED). The control module 82 can control the display module 84 to output different lighting effects according to the first state information, the second state information, and the third state information. For example, in the first state information, the control module 82 controls the display module 84 to output a lighting effect such as breathing light. In the second state information, the control module 82 controls the display module 84 to output a lighting effect such as constant light. In the third state information, the control module 82 controls the display module 84 to output a light effect such as extinction light. Specifically, the display module 84 can also display other lighting effects (e.g., no light output), but the present invention is not limited thereto.

In the second embodiment, the case unit 2 further includes a see-through portion 22 arranged in the housing 21 and a release opening 23 disposed in the housing 21. The see-through portion 22 is disposed on the housing 21 at the outer edge of the release opening 23, the pressing body 61 is exposed by the release opening 23, and the accommodating space 31 is exposed by the release opening 23, such that the tongue element 41 enters and leaves the accommodating space 31 through the release opening 23.

The display module 84 may be disposed close to the see-through portion 22, or may be directly disposed on the see-through portion 22. The light emitted from the display module 84 is output through the see-through portion 22. Since the see-through portion 22 surrounds the release opening 23, when the light emitted from the display module 84 is output through the see-through portion 22, the occupant can easily insert the tongue element 41 into the release opening 23 in a dark environment or confirm the position of the pressing body 61 to press and unlock the buckle device.

Figure 16:
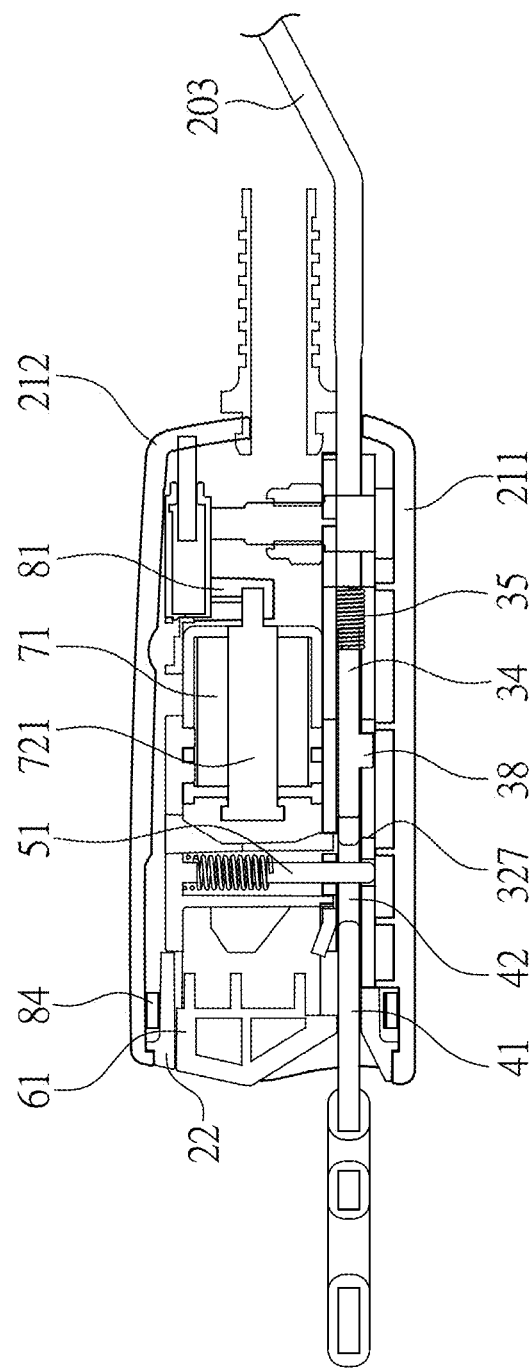
FIG. 16 is a schematic illustrating a tongue element detection module is arranged in a buckle device capable of displaying a locked state according to a third embodiment of the present invention.
Figure 17:
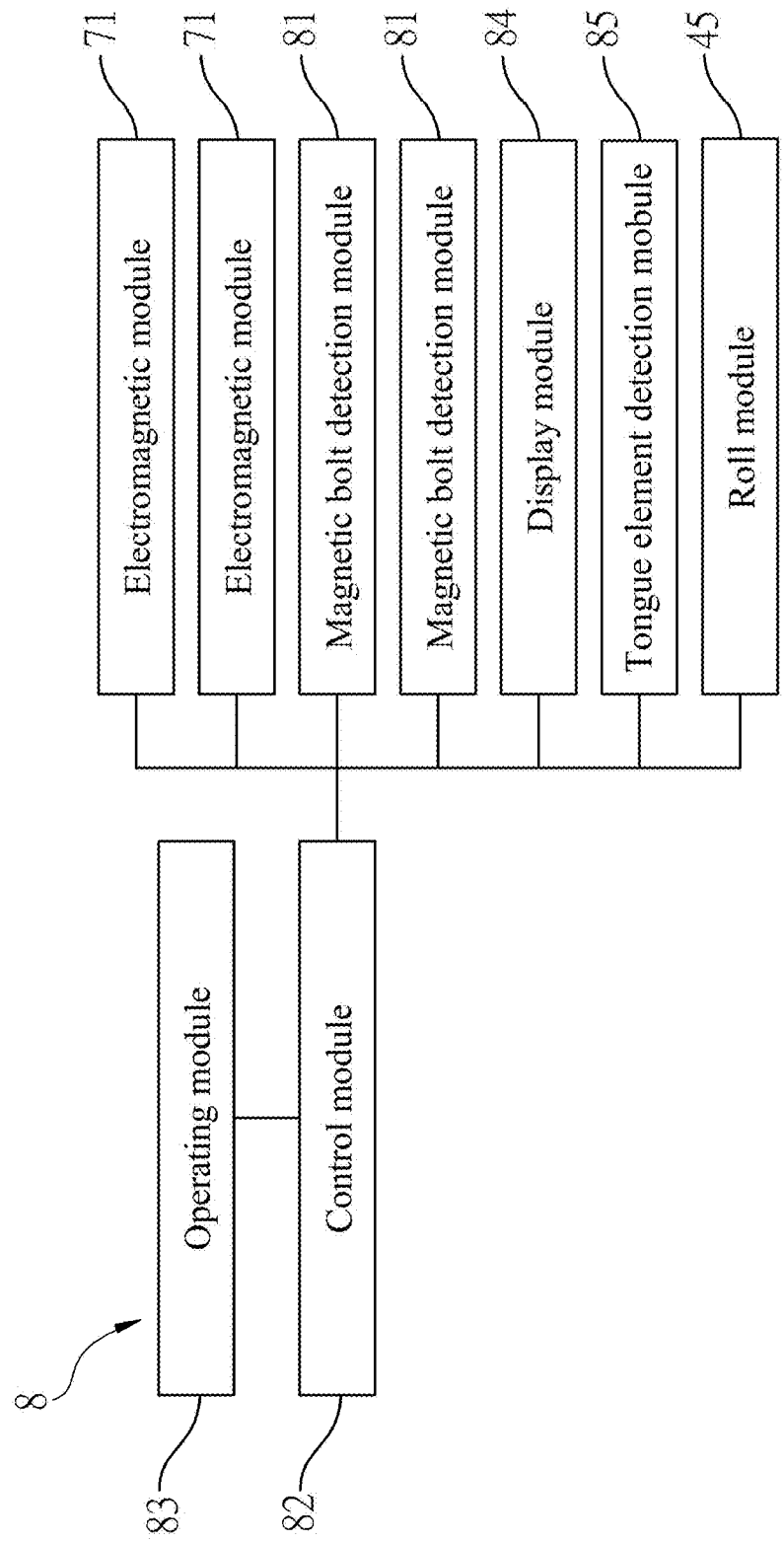
FIG. 17 is a diagram illustrating the device configuration, in which the tongue element detection module is disposed according to the third embodiment of the present invention.

Referring to FIG. 16 and FIG. 17, FIGS. 16, 17 are diagrams illustrating a buckle device capable of displaying a locked state according to a third embodiment of the present invention. The difference between the third embodiment and the second embodiment is that the control unit 8 further includes a tongue element detection module 85 disposed on the main body 32 and electrically connected to the control module 82. The tongue element detection module 85 is configured to detect whether the tongue element 41 is arranged in the accommodating space 31. For example, the tongue element detection module 85 detecting the tongue element 41 represents that the tongue element 41 has located in the accommodating space 31. The tongue element detection module 85 not detecting the tongue element 41 represents that the tongue element 41 is no longer located in the accommodating space 31. Specifically, the tongue element detection module 85 can also determine whether the tongue element 41 is located in the accommodating space 31 according to the interference relationship between the bolt body 51 and the tongue element 41. For example, the tongue element detection module 85 can detect whether the fastening portion 511 of the bolt body 51 is inserted into the second through hole 36, such that the control module 82 can confirm the position of the tongue element 41, but the present invention is not limited thereto. In other words, the control module 82 receives the detection information of the tongue element detection module 85 and controls the display module 84 to display a current state according to whether the tongue element 41 is arranged in the accommodating space 31.

Referring to Table 3, the control module 82 receives the detection information of the tongue element detection module 85 and controls the display module 84 to display the state information according to whether the tongue element 41 is located in the accommodating space 31 or not. For example, when the tongue element detection module 85 detects that the tongue element 41 is not located in the accommodating space 31 and the electromagnetic module 71 is excited, the scenario that the occupant has not inserted the tongue element 41 in the accommodating space 31 is known. The control module 82 controls the electromagnetic module 71 to be excited and the output electromagnetic force moves the electromagnetic rod 72 to the release position. At this time, the display module 84 displays the first state information. When the tongue element detection module 85 detects that the tongue element 41 is located in the accommodating space 31 and the electromagnetic module 71 is excited, the scenario that the occupant has inserted the tongue element 41 into the accommodation space 31 is known. The control module 82 controls the electromagnetic module 71 to be excited, and the output electromagnetic force moves the electromagnetic rod 72 to the release position. At this time, the display module 84 displays the second state information. When the tongue element detection module 85 detects that the tongue element 41 is located in the accommodating space 31 and the electromagnetic module 71 is not excited, the scenario that the occupant has inserted the tongue element 41 into the accommodation space 31 is known. The control module 82 controls the electromagnetic module 71 to be not excited, the rod elastic body 73 pushes the electromagnetic rod 72 to the lock position. At this time, the display module 84 displays the third state information.

TABLE 3

| Display module output light effect | First state information (e.g., breathing light) | Second state information (e.g., constant light) | Third state information (e.g., extinction light) |
|---|---|---|---|
| State of tongue element | Not insert | Insert | Insert |
| tongue element detection module detecting | Not trigger | Trigger | Trigger |
| State of electromagnetic module | Excited | Excited | Not excited |

In the third embodiment, the display module 84 comprises a plurality of light-emitting elements disposed on the main body 32. Specifically, the quantity of the light-emitting elements of the display module 84 should be determined according to the requirement, but the present invention is not limited thereto. Preferably, the plurality of light-emitting elements are full-color light-emitting diodes (RGB LED). The control module 82 can control the display module 84 to output different lighting effects according to the first state information, the second state information, and the third state information. For example, in the first state information, the control module 82 controls the display module 84 to output a lighting effect such as breathing light. In the second state information, the control module 82 controls the display module 84 to output a lighting effect such as constant light. In the third state information, the control module 82 controls the display module 84 to output a light effect such as extinction light. Specifically, the display module 84 can also display other lighting effects (e.g., no light output), but the present invention is not limited thereto.

In the third embodiment, a material of the pressing body 61 is a transparent material. The display module 84 is arranged close to the pressing body 61, such that the light emitted from the display module 84 can be output through the pressing body 61. Specifically, in combination with the second embodiment, the display module 84 can also be disposed on the see-through portion 22 of the housing 21. Furthermore, the display module 84 disposed on the see-through portion 22 emit light through the see-through portion 22 and the pressing body 61 to the outside. In this way, the pressing body 61 may output the state information of the buckle device with lighting effects, but the present invention is not limited thereto.

The following advantages can be obtained by the above description:

1. Displaying position in dark environment: The see-through portion 22 surrounds the release opening 23, and the light emitted from the display module 84 can be output through the see-through portion 22. In a dark environment, the position of the buckle device can be shown, and the position of the release opening 23 can be shown, such that the occupant can easily insert the tongue element 41 into the accommodating space 31 through the release opening 23.

2. Lighting effects showing locked states: The display module 84 can display the corresponding lighting effects according to different locking states. The staff just needs to check the displayed lighting effects to confirm the locked state of the buckle devices. The locked state of the buckle device does not need to be confirmed by the staff's touch.

3. Preventing spread of germs: According to the above arrangement, since the staff does not need to confirm the locking state of the buckle device by touching, the staff can keep a social distance from the occupant, thereby preventing the spread of germs.

4. Improving output: The assembling method of the invention is performed by a layer-by-layer stacking arrangement, wherein the setting of the spring is relatively simple, and the structure is not slidable. The buckle device can be assembled quickly, and the production of the buckle device can be effectively improved.

5. Preventing press: When the two electromagnetic rods 72 are located at the lock position, the two blocking parts 722 of the two electromagnetic rods 72 respectively interfere with the two wings 513 of the two bolt bodies 51, and there will be resistance to prevent the pressing body 61 from being pressed by an external force.

6. Enhancing structure: In the invention, the two bolt bodies 51 move in a straight up and down manner, and the two fastening guide bodies 53 effectively control the two bolt bodies 51 and provide support strength. Furthermore, the two first through holes 33 and the two second through holes 36 simultaneously abut against the fastening portion 511 of the bolt body 51. Compared with the conventional rotation structure of the vertical disk, the two bolt bodies 51 can withstand greater pulling force, such that the latch unit 4 is not easily separated from the accommodating space 31.

In summary, the display module 84 can display the locked state of the buckle device with different lighting effects. The operator can directly confirm the locked state of the buckle device from the displayed light. The display module 84 installed in the housing 21 can emit light through the see-through portion 22 or the pressing body 61, such that the occupants may confirm the position of the buckle device in a dark environment. When the buckle device is idle, the display module 84 can output brilliant lighting effects, which can improve the pleasure of the occupants, so the objective of the invention can be obtained.

It must be noted that the embodiments described above are only embodiments of the present invention. All equivalent structures that employ the concepts disclosed in this specification and the appended claims should fall within the scope of the present invention.

The invention claimed is:

1. A buckle device capable of displaying a locked state, comprising:
    a main body unit comprising a main body defining and surrounding an accommodating space;
    a latch unit comprising a tongue element detachably arranged in the accommodating space;
    a fastening unit comprising at least one bolt body arranged on the main body, wherein the at least one bolt body detachably interferes with the tongue element arranged in the accommodating space, when the at least one bolt body interferes with the tongue element, the tongue element is securely fastened to prevent the tongue element from leaving the accommodating space;
    an electromagnetic unit comprising at least one electromagnetic module and at least one electromagnetic rod, the at least one electromagnetic module being arranged in the main body, the at least one electromagnetic rod being arranged through the at least one electromagnetic module; and
    a control unit comprising a control module electrically connected to the at least one electromagnetic module, a magnetic bolt detection module arranged on the main body and electrically connected to the control module, and a display module electrically connected to the control module;
    wherein the control module controls whether the electromagnetic module is excited or not, the magnetic bolt detection module is configured to detect a position of the at least one electromagnetic rod;
    wherein when the electromagnetic module is excited and generates a magnetic force for the at least one electromagnetic rod, the at least one electromagnetic rod is moved to a release position, such that the at least one electromagnetic rod and the at least one bolt body are separated from each other;
    wherein when the electromagnetic module is not excited and the at least one bolt body locks the tongue element, the at least one electromagnetic rod is moved to a lock position and interferes with the at least one bolt body, in order to lock the at least one bolt body to prevent the at least one bolt body from releasing the tongue element, and the control module is configured to receive detection information of the magnetic bolt detection module and controls the display module to display a current state according to the position of the at least one electromagnetic rod.

2. The buckle device capable of displaying the locked state of claim 1, wherein the latch unit further comprises a reel connected to the tongue element, and a roll module connected to the reel and electrically connected to the control module, the roll module is configured to rewind the reel.

3. The buckle device capable of displaying the locked state of claim 2, wherein the roll module is an electromagnet rewinding structure, the control module controls whether the roll module is excited or not, when the control module controls the roll module to be not excited, the roll module rewinds the reel and the reel is not able to be pulled out from the roll module, and when the control module controls the roll module to be excited, the roll module rewinds the reel and the reel is able to be pulled out from the roll module.

4. The buckle device capable of displaying the locked state of claim 2, wherein when the at least one bolt body does not interfere with the tongue element and the at least one electromagnetic rod is in the release position and the roll module is excited, the display module displays first state information, when the at least one bolt body interferes with the tongue element and the electromagnetic module is not excited and the roll module is excited, the display module displays second state information, when the at least one bolt body interferes with the tongue element and the electromagnetic module is not excited and the roll module is not excited, the display module displays third state information.

5. The buckle device capable of displaying the locked state of claim 4, wherein the display module is at least one light emitting element arranged on the main body, and the display module outputs different lighting effects according to the first, second and third state information, respectively.

6. The buckle device capable of displaying the locked state of claim 1, wherein the control unit further comprises a tongue element detection module arranged on the main body and electrically connected to the control module, the tongue element detection module is configured to detect whether the tongue element is arranged in the accommodating space, and the control module receives the detection information of the tongue element detection module and controls the display module to display a current state according to whether the tongue element is arranged in the accommodating space.

7. The buckle device capable of displaying the locked state of claim 6, wherein when the tongue element detection module detects that the tongue element is not arranged in the accommodating space and the electromagnetic module is excited, the display module displays first state information, when the tongue element detection module detects that the tongue element is arranged in the accommodating space and the electromagnetic module is excited, the display module displays second state information, and when the tongue element detection module detects that the tongue element is arranged in the accommodating space and the electromagnetic module is not excited, the display module displays third state information.

8. The buckle device capable of displaying the locked state of claim 1, further comprising a case unit and a pressing unit, wherein the case unit comprises a housing surrounding the main body, the fastening unit and the pressing unit, and a release opening arranged in the housing, the pressing unit comprises a pressing body arranged on the main body and detachably connected to the at least one bolt body, the pressing body is movable between a first position and a second position, when the pressing body is in the first position, the at least one bolt body and the tongue element interfere with each other, when the electromagnetic rod is in the release position and the at least one bolt body and the tongue element interfere with each other, the pressing body is able to be pushed by an external force for being moved from the first position to the second position, such that the pressing body drives the at least one bolt body off the tongue element.

9. The buckle device capable of displaying the locked state of claim 8, wherein the case unit further comprises a see-through portion arranged on the housing, and light emitted from the display module is output through the see-through portion.

10. The buckle device capable of displaying the locked state of claim 9, wherein the release opening is configured to expose the pressing body, and the see-through portion is arranged on an outer edge of the release opening.

11. The buckle device capable of displaying the locked state of claim 8, wherein the release opening exposes the accommodating space, such that the tongue element is able to enter or to be removed from the accommodating space through the release opening.

12. The buckle device capable of displaying the locked state of claim 8, wherein a material of the pressing body is a transparent material, and a light emitted from the display module can be output through the pressing body.

13. The buckle device capable of displaying the locked state of claim 8, wherein the pressing body further comprises a pressing elastic body arranged on the main body and abutting against the pressing body, and an elastic force of the pressing elastic body can push the pressing body to move from the second position to the first position.

14. The buckle device capable of displaying the locked state of claim 1, wherein the main body unit further comprises at least one first through hole arranged in the main body, the latch unit further comprises at least one tongue opening arranged in the tongue element, the bolt body is configured to penetrate through the at least one first through hole and be protruded from the tongue opening of the tongue element arranged in the accommodating space, such that the bolt body and the tongue element interfere with each other.

15. The buckle device capable of displaying the locked state of claim 14, wherein the main body unit further comprises at least one second through hole arranged on the main body and apart from the at least one first through hole, when the bolt body penetrates through the tongue opening, the bolt body further penetrates the at least one second through hole.

\* \* \* \* \*